(12) United States Patent  (10) Patent No.: US 8,102,948 B2
Gau et al.  (45) Date of Patent: Jan. 24, 2012

(54) CARRIER RECOVERY APPARATUS AND METHOD THEREOF

(75) Inventors: Guo-Hau Gau, Tainan County (TW); Pei-Jun Shih, Tainan County (JP); Shin-Shiuan Cheng, Tainan County (JP)

(73) Assignee: Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 494 days.

(21) Appl. No.: 12/393,023

(22) Filed: Feb. 25, 2009

(65) Prior Publication Data
US 2010/0215126 A1    Aug. 26, 2010

(51) Int. Cl.
*H04B 17/00* (2006.01)
(52) U.S. Cl. ........ 375/326; 375/316; 375/324; 375/327; 375/340; 375/344; 375/354; 375/375; 375/376; 329/304; 329/307; 329/356; 329/357; 348/725; 348/726; 348/729; 327/141; 327/147; 327/156
(58) Field of Classification Search ................... 375/316, 375/324, 326, 327, 340, 344, 354, 375, 376; 329/304, 307, 356, 357; 348/725, 726, 729; 327/141, 147, 156
See application file for complete search history.

(56) References Cited

U.S. PATENT DOCUMENTS
7,558,340 B2 * 7/2009 Kim et al. .................... 375/326
* cited by examiner

*Primary Examiner* — Leon Flores
(74) *Attorney, Agent, or Firm* — Winston Hsu; Scott Margo

(57) ABSTRACT

A carrier recovery apparatus includes a pilot strength detector, a first lock loop, a second lock loop, and a controller. The pilot strength detector determines whether a pilot strength of an input signal is greater than a threshold value to generate a control signal. The first lock loop performs a first carrier recovery on the input signal. The second lock loop performs a second carrier recovery on the input signal. The controller selectively allows the first lock loop to perform the first carrier recovery on the input signal or the second lock loop to perform the second carrier recovery on the input signal according to the control signal. The first lock loop is a pilot-based FPLL and the second locked loop is a pilot-less PLL.

6 Claims, 3 Drawing Sheets

CARRIER RECOVERY APPARATUS AND METHOD THEREOF

BACKGROUND OF THE INVENTION

1. Field of the Invention

The present invention relates to a carrier recovery apparatus and a related method, and more particularly, to a carrier recovery apparatus and a related method selectively allowing a pilot-based FPLL or a pilot-less PLL to perform the carrier recovery on an input signal according to a pilot strength of the input signal.

2. Description of the Prior Art

In many communication systems, a pilot is purposely added to facilitate carrier recovery at the receiver side. For these systems, a conventional pilot-based frequency and phase lock loop (FPLL) is typically used to achieve both wide acquisition range and fast acquisition speed. However, under fading channels, if the pilot is severely attenuated or even notched due to fading, the conventional pilot-based FPLL will lose lock and cause disruption in reception.

In order to solve such problem, different proposals for pilot-less FPLL are already disclosed in the past years. Nevertheless, these proposals are too complicated to be practically implemented and spend higher cost. Hence, how to overcome such drawbacks and how to reduce cost become an important topic of the field.

SUMMARY OF THE INVENTION

It is one of the objectives of the claimed invention to provide a carrier recovery apparatus and a related method to solve the abovementioned problems.

According to one embodiment, a carrier recovery apparatus is provided. The carrier recovery apparatus includes a pilot strength detector, a first lock loop, a second lock loop, and a controller. The pilot strength detector determines whether a pilot strength of an input signal is greater than a threshold value to generate a control signal. The first lock loop performs a first carrier recovery on the input signal. The second lock loop performs a second carrier recovery on the input signal. The controller selectively allows the first lock loop to perform the first carrier recovery on the input signal or the second lock loop to perform the second carrier recovery on the input signal according to the control signal. The first lock loop is a pilot-based FPLL and the second locked loop is a pilot-less PLL.

According to another embodiment, a method for carrier recovery is provided. The method includes the step of determining whether a pilot strength of an input signal is greater than a threshold value to generate a control signal; and selectively allowing a pilot-based FPLL to perform a first carrier recovery on the input signal or a pilot-less PLL to perform a second carrier recovery on the input signal according to the control signal. When the control signal indicates that the pilot strength of the input signal is greater than the threshold value, allow the pilot-based FPLL to perform the first carrier recovery on the input signal; and when the control signal indicates that the pilot strength of the input signal is not greater than the threshold value, allow the pilot-less PLL to perform the second carrier recovery on the input signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . .". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
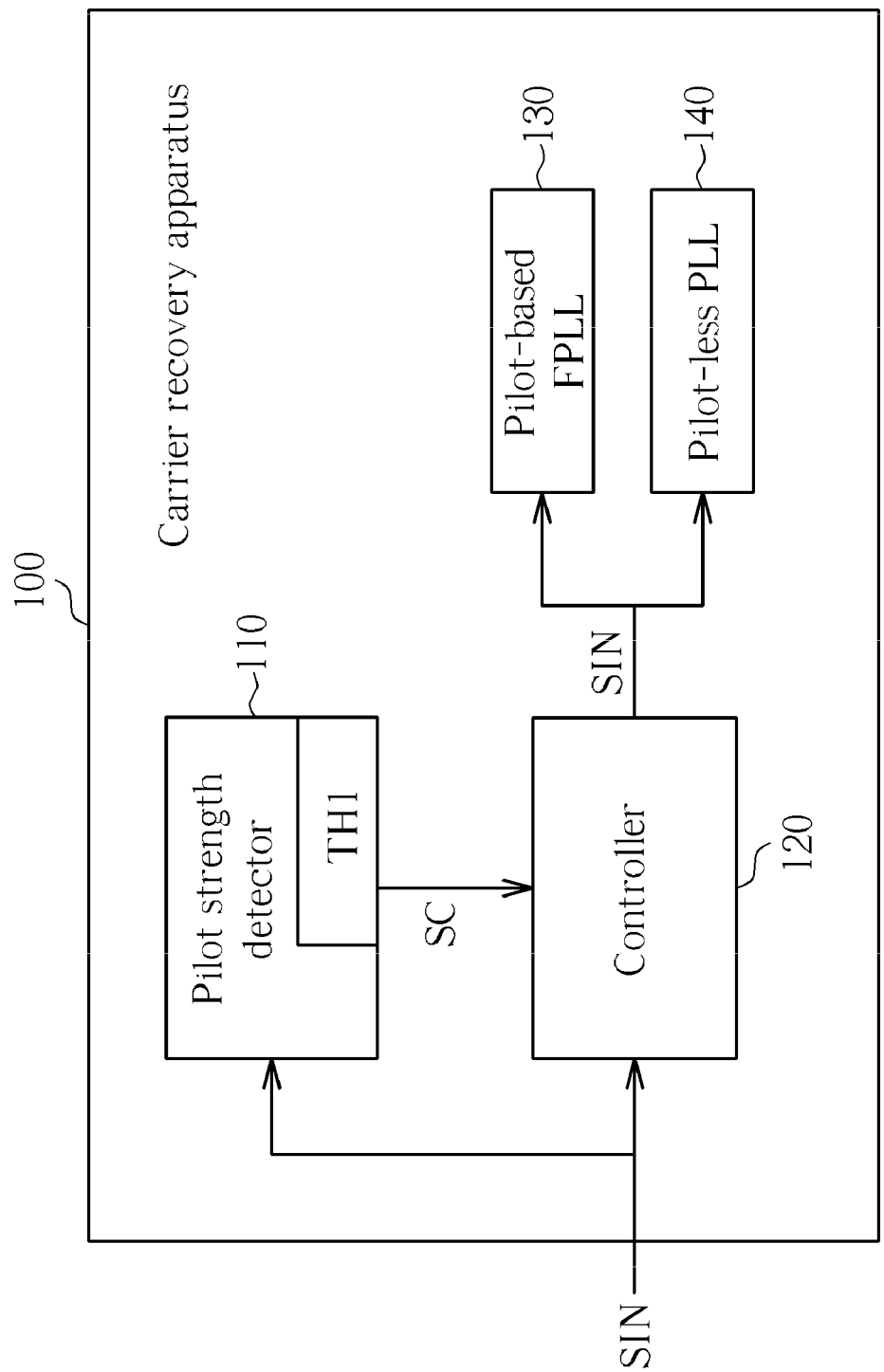
FIG. 1 is a diagram of a carrier recovery apparatus according to a first embodiment of the present invention.

Please refer to FIG. 1. FIG. 1 is a diagram of a carrier recovery apparatus 100 according to a first embodiment of the present invention. As shown in FIG. 1, the carrier recovery apparatus 100 includes, but is not limited to, a pilot strength detector 110, a pilot-based frequency and phase lock loop (FPLL) 130, a pilot-less phase lock loop (PLL) 140, and a controller 120. The pilot strength detector 110 determines whether a pilot strength of an input signal SIN is greater than a threshold value TH1 to generate a control signal SC. The pilot-based FPLL 130 performs a first carrier recovery on the input signal SIN. The pilot-less PLL 140 performs a second carrier recovery on the input signal SIN. The controller 120 is coupled to the pilot strength detector 110, the pilot-based FPLL 130, and the pilot-less PLL 140 for selectively allowing the pilot-based FPLL 130 to perform the first carrier recovery on the input signal SIN or the pilot-less PLL 140 to perform the second carrier recovery on the input signal SIN according to the control signal SC.

When the control signal SC indicates that the pilot strength of the input signal SIN is greater than the threshold value TH1, the controller 120 allows the pilot-based FPLL 130 to perform the first carrier recovery on the input signal SIN. When the control signal SC indicates that the pilot strength of the input signal SIN is not greater than the threshold value TH1, the controller 120 allows the pilot-less PLL 140 to perform the second carrier recovery on the input signal SIN. In other words, the controller 140 can determine to allow the pilot-based FPLL 130 or the pilot-less PLL 140 to perform the carrier recovery on the input signal SIN according to the pilot strength of the input signal SIN. Therefore, if the pilot is severely attenuated or even notched due to fading, the pilot-less PLL 140 will replace the pilot-based FPLL 130 to perform the carrier recovery on the input signal, which can avoid the problem of losing lock and causing disruption in reception to improve the whole system stability. In addition, the pilot-less PLL is more implementation-friendly than the conventional pilot-less FPLL, which lowers the complexity and saves the cost.

Please note that the pilot-based FPLL 130 and the pilot-less PLL 140 can be digitally implemented, but is not limited to this and can be analogically implemented.

Figure 2:
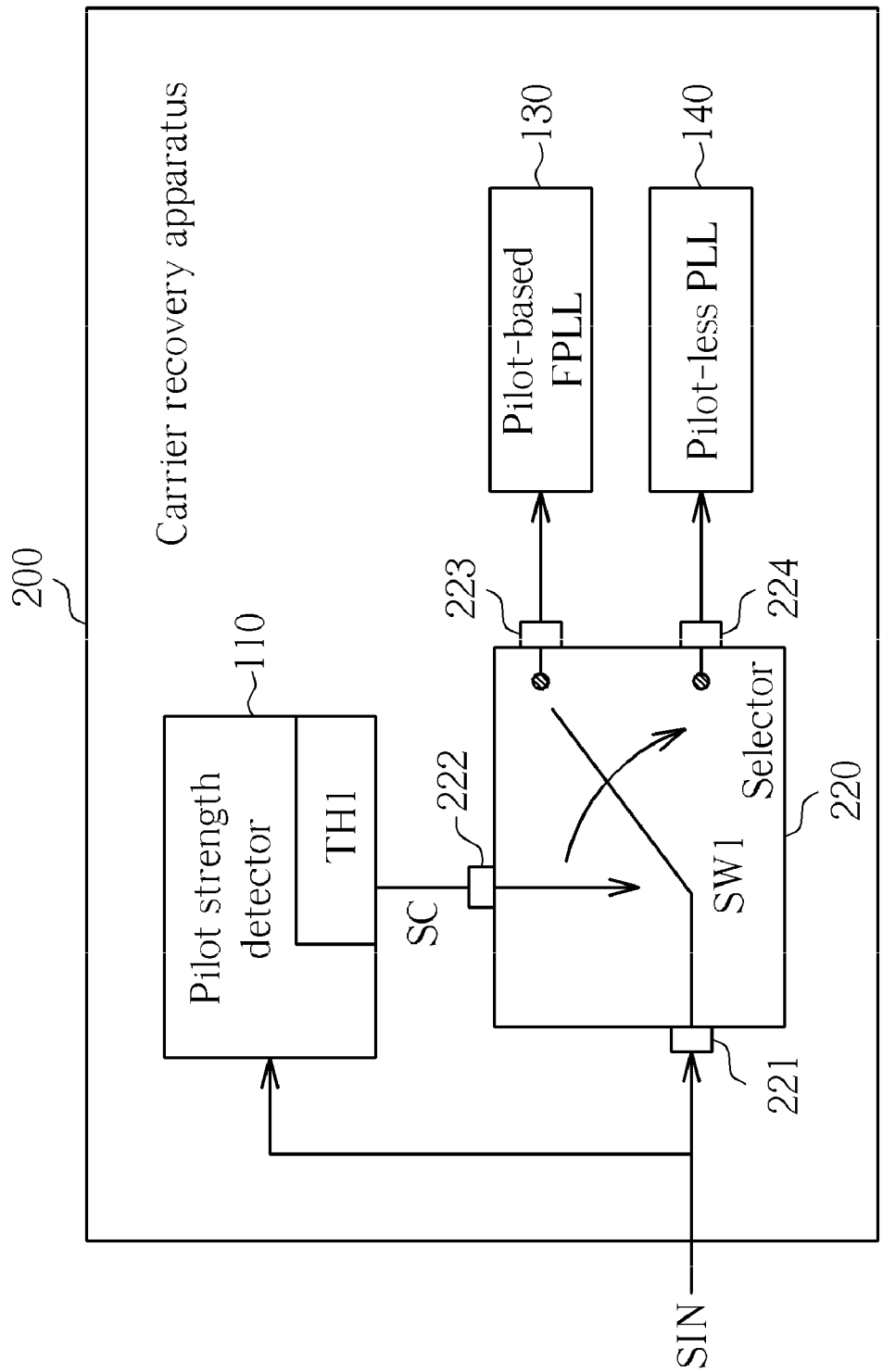
FIG. 2 is a diagram of a carrier recovery apparatus according to a second embodiment of the present invention.

Please refer to FIG. 2. FIG. 2 is a diagram of a carrier recovery apparatus 200 according to a second embodiment of the present invention. As shown in FIG. 2, the architecture of the carrier recovery apparatus 200 is similar to that in FIG. 1, the difference being that the controller of the carrier recovery apparatus 200 is a selector 220. In this embodiment, the selector 220 is implemented by a switch SW1, but this should not be considered as a limitation of the present invention. The selector 220 has an input end 221 for receiving the input signal SIN, a control end 222 coupled to the pilot strength detector 110 for receiving the control signal SC, a first output end 223 coupled to the pilot-based FPLL 130, and a second output end 224 coupled to the pilot-less PLL 140. The selector 220 transmits the input signal SIN to the pilot-based FPLL 130 when the control signal SC indicates that the pilot strength of the input signal SIN is greater than the threshold value TH1; otherwise, the selector 220 transmits the input signal SIN to the pilot-less PLL 140.

Please note that the abovementioned embodiments are merely examples for describing the present invention, and in no way should be considered to be limitations of the scope of the present invention. Those skilled in the art should appreciate that various modifications of the controller (or the selector) may be made without departing from the spirit of the present invention, which should also belong to the scope of the present invention. In addition, the threshold value TH1 is not a fixed value, and can be adjusted depending on practical demands, such as the channel status or the standard of the received input signal SIN.

Figure 3:
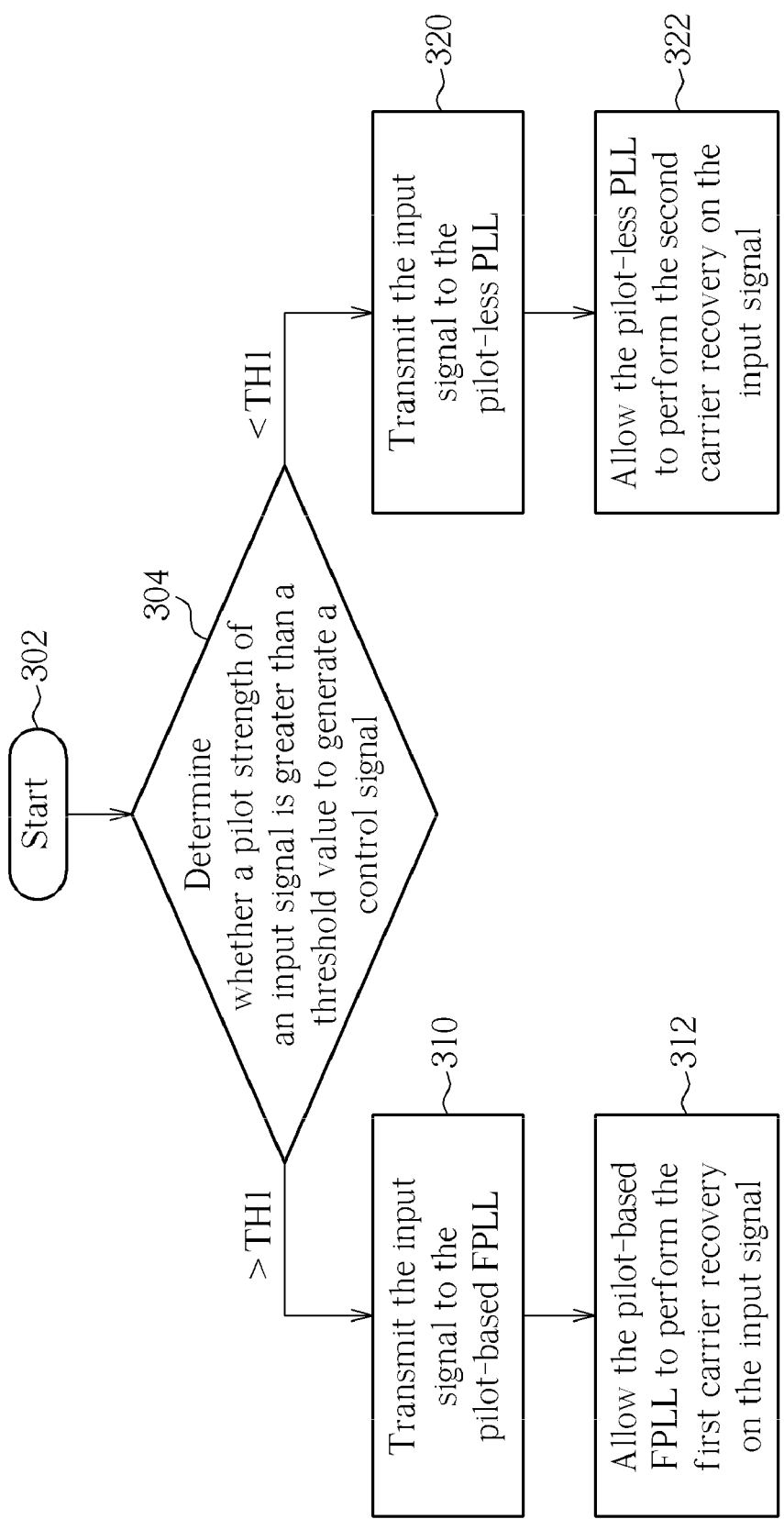
FIG. 3 is a flowchart illustrating a method for carrier recovery according to an embodiment of the present invention.

Please refer to FIG. 3. FIG. 3 is a flowchart illustrating a method for carrier recovery according to an embodiment of the present invention. Please note that the following steps are not limited to be performed according to the exact sequence shown in FIG. 3 if a roughly identical result can be obtained. The method includes, but is not limited to, the following steps:

Step 302: Start.

Step 304: Determine whether a pilot strength of an input signal is greater than a threshold value to generate a control signal.

Step 310: Transmit the input signal to the pilot-based FPLL.

Step 312: Allow the pilot-based FPLL to perform the first carrier recovery on the input signal.

Step 320: Transmit the input signal to the pilot-less PLL.

Step 322: Allow the pilot-less PLL to perform the second carrier recovery on the input signal.

Please refer to FIG. 3 together with FIG. 1 or FIG. 2. The following description details how each element operates by collocating the steps shown in FIG. 3 and the elements shown in FIG. 1 or FIG. 2. In Step 304, the pilot strength detector 110 determines whether the pilot strength of the input signal SIN is greater than the threshold value TH1 to generate the control signal SC. If the pilot strength of the input signal SIN is greater than the threshold value TH1, execute the steps 310 and 312; otherwise, go to the steps 320 and 322. When the pilot strength of the input signal SIN is greater than the threshold value TH1, the controller 120 or the selector 220 transmits the input signal SIN to the pilot-based FPLL 130 and allows it to perform the first carrier recovery on the input signal SIN (the steps 310 and 312). When the pilot strength of the input signal SIN is not greater than the threshold value TH1, the controller 120 or the selector 220 transmits the input signal SIN to the pilot-less PLL 140 and allows it to perform the second carrier recovery on the input signal SIN (the steps 320 and 322).

Provided that substantially the same result is achieved, the steps of the method shown in FIG. 3 need not be in the exact order shown and need not be contiguous: other steps can be intermediate.

The abovementioned embodiments are presented merely for describing the present invention, and in no way should be considered to be limitations of the scope of the present invention. In summary, the present invention provides a carrier recovery apparatus and a related method. The carrier recovery apparatus disclosed in the present invention combines a pilot-based FPLL or a pilot-less PLL, and determines when to allow the pilot-based FPLL or the pilot-less PLL to perform the carrier recovery on the input signal SIN according to the pilot strength of the input signal SIN. Therefore, the problem of losing lock and causing disruption in reception can be avoided to improve the whole system stability even if the pilot is severely attenuated or even notched due to fading. Additionally, the pilot-less PLL disclosed in the present invention is more implementation-friendly than the conventional pilot-less FPLL, which lowers the complexity and saves the cost. Furthermore, the threshold value TH1 of the pilot strength detector can be adjusted depending on practical channel status or the standard of the received input signal SIN, so as to be applied to various situations.

Those skilled in the art will readily observe that numerous modifications and alterations of the device and method may be made while retaining the teachings of the invention.

What is claimed is:

1. A carrier recovery apparatus, comprising: a pilot strength detector, for determining whether a pilot strength of an input signal is greater than a threshold value to generate a control signal; a first lock loop being a pilot-based frequency and phase lock loop (FPLL), for performing a first carrier recovery on the input signal; a second lock loop being a pilot-less phase lock loop (PLL), for performing a second carrier recovery on the input signal; and a controller, coupled to the pilot strength detector, the first lock loop, and the second lock loop, for selectively allowing the first lock loop to perform the first carrier recovery on the input signal or the second lock loop to perform the second carrier recovery on the input signal according to the control signal, wherein the controller is a selector for transmitting the input signal to the first lock loop when the control signal indicates that the pilot strength of the input signal is greater than the threshold value, and transmitting the input signal to the second lock loop when the control signal indicates that the pilot strength of the input signal is not greater than the threshold value.

2. The carrier recovery apparatus of claim 1, wherein the selector has an input end for receiving the input signal, a control end coupled to the pilot strength detector for receiving the control signal, a first output end coupled to the first lock loop, and a second output end coupled to the second lock loop, and the selector selectively transmits the input signal to the first lock loop or the second lock loop according to the control signal.

3. The carrier recovery apparatus of claim 1, wherein the first lock loop is digitally implemented, and the second lock loop is digitally implemented.

4. The carrier recovery apparatus of claim 1, wherein the first lock loop is analogically implemented, and the second lock loop is analogically implemented.

5. A method for carrier recovery, comprising: determining whether a pilot strength of an input signal is greater than a threshold value to generate a control signal; and selectively allowing a pilot-based FPLL to perform a first carrier recovery on the input signal or a pilot-less PLL to perform a second carrier recovery on the input signal according to the control signal, wherein when the control signal indicates that the pilot strength of the input signal is greater than the threshold value, the input signal is transmitted to the pilot-based FPLL, and when the control signal indicates that the pilot strength of the input signal is not greater than the threshold value, the input signal is transmitted to the pilot-less PLL.

6. The method of claim 5, wherein the step of selectively allowing the pilot-based FPLL to perform the first carrier recovery on the input signal or the pilot-less PLL to perform the second carrier recovery on the input signal according to the control signal comprises:

when the control signal indicates that the pilot strength of the input signal is greater than the threshold value, allowing the pilot-based FPLL to perform the first carrier recovery on the input signal; and when the control signal indicates that the pilot strength of the input signal is not greater than the threshold value, allowing the pilot-less PLL to perform the second carrier recovery on the input signal.

* * * * *